US008666798B2

(12) United States Patent  (10) Patent No.: US 8,666,798 B2
Charles  (45) Date of Patent: Mar. 4, 2014

(54) METHOD AND SYSTEM FOR RAPIDLY PROJECTING AND FORECASTING PHARMACEUTICAL MARKET INFORMATION

(75) Inventor: Paul Richard Charles, Hertfordshire (GB)

(73) Assignee: IMS Health Incorporated, Danbury, CT (US)

(*) Notice: Subject to any disclaimer, the term of this patent is extended or adjusted under 35 U.S.C. 154(b) by 1323 days.

(21) Appl. No.: 10/497,269

(22) PCT Filed: Dec. 23, 2002

(86) PCT No.: PCT/US02/41068
§ 371 (c)(1),
(2), (4) Date: Jan. 3, 2006

(87) PCT Pub. No.: WO03/060642
PCT Pub. Date: Jul. 24, 2003

(65) Prior Publication Data
US 2010/0121675 A1  May 13, 2010

Related U.S. Application Data (60) Provisional application No. 60/347,417, filed on Jan. 11, 2002.

(51) Int. Cl.
G06Q 10/00 (2012.01)
G06Q 30/00 (2012.01)
(52) U.S. Cl.
USPC ............................................ 705/7.34
(58) Field of Classification Search
USPC ................................. 705/10, 7.34
See application file for complete search history.

(56) References Cited

U.S. PATENT DOCUMENTS

| 5,237,496 | A |   | 8/1993 | Kagami et al. ............... 364/401 |
| 5,420,786 | A | * | 5/1995 | Felthauser et al. ............... 705/2 |
| 5,596,493 | A | * | 1/1997 | Tone et al. ............... 705/10 |
| 5,771,172 | A |   | 6/1998 | Yamamoto et al. ...... 364/468.13 |

(Continued)

FOREIGN PATENT DOCUMENTS

| JP | 11-252226 | 9/1999 |
| JP | 2001-124474 | 5/2001 |
| JP | 2001-271499 | 10/2001 |
| JP | 2001-286101 | 10/2001 |

OTHER PUBLICATIONS

Examiner's Report issued Jul. 6, 2012 in Canadian Application No. 2,469,511, 4 pages.

(Continued)

Primary Examiner — Andre Boyce
(74) Attorney, Agent, or Firm — Fish & Richardson P.C.

(57) ABSTRACT

A system and method for providing a monthly cumulative prediction of pharmaceutical sales of a particular pharmaceutical, or group of pharmaceuticals, in a current month is disclosed. In particular, the technique of the present invention provides for extrapolating a sample of sales data for a given day across that entire day (114), extrapolating sales data for at least 14 prior days across an entire month (116); adjusting the monthly cumulative prediction by comparing past predicted values with past actual values (118); adjusting the monthly cumulative prediction to account for sales anomalies created by national or local holidays (120); and provides confidence intervals indicating the believed accuracy of the current monthly cumulative prediction (122).

20 Claims, 7 Drawing Sheets

(56) References Cited

U.S. PATENT DOCUMENTS

| | | | |
|---|---|---|---|
| 6,609,101 B1 * | 8/2003 | Landvater | 705/10 |
| 7,174,304 B1 * | 2/2007 | Boardman | 705/10 |
| 7,580,851 B1 * | 8/2009 | Copeland | 705/10 |

OTHER PUBLICATIONS

Stanton, "Medium-Range, Weekly and Seasonal Peak Demand Forecasting by Probability Methods", Power Apparatus and Systems, IEEE Transactions on, PAS-90, Issue 3, pp. 1183-1189, May 1979.

* cited by examiner

| Day | Proportion |
|---|---|
| Monday | 0.19 |
| Tuesday | 0.20 |
| Wednesday | 0.21 |
| Thursday | 0.22 |
| Friday | 0.18 |
| Saturday | 0.00 |
| Sunday | 0.00 |

|  308 |  310 |  312 |  314 |  316 |
|---|---|---|---|---|
| Date | Day of Week | Relative Weight Of Day | Cume/ Borrowed Weight | Forecast Factor |
| 16/07/2001 | Monday | 0.19 | | |
| 17/07/2001 | Tuesday | 0.20 | | |
| 18/07/2001 | Wednesday | 0.21 | | |
| 19/07/2001 | Thursday | 0.22 | | |
| 20/07/2001 | Friday | 0.18 | | |

| Date | Day of Week | Relative Weight Of Day | Cume/ Borrowed Weight | Forecast Factor |
|---|---|---|---|---|
| 21/07/2001 | Saturday | 0.00 | | |
| 22/07/2001 | Sunday | 0.00 | | |
| 23/07/2001 | Monday | 0.19 | | |
| 24/07/2001 | Tuesday | 0.20 | | |
| 25/07/2001 | Wednesday | 0.21 | | |
| 26/07/2001 | Thursday | 0.22 | | |
| 27/07/2001 | Friday | 0.18 | | |
| 28/07/2001 | Saturday | 0.00 | | |
| 29/07/2001 | Sunday | 0.00 | | |
| 30/07/2001 | Monday | 0.19 | | |
| 31/07/2001 | Tuesday | 0.20 | | |
| 01/08/2001 | Wednesday | 0.21 | 2.00 | 2.215 |
| 02/08/2001 | Thursday | 0.22 | 2.00 | 2.215 |
| 03/08/2001 | Friday | 0.18 | 2.00 | 2.215 |
| 04/08/2001 | Saturday | 0.00 | 2.00 | 2.215 |
| 05/08/2001 | Sunday | 0.00 | 2.00 | 2.215 |
| 06/08/2001 | Monday | 0.19 | 2.00 | 2.215 |
| 07/08/2001 | Tuesday | 0.20 | 2.00 | 2.215 |
| 08/08/2001 | Wednesday | 0.21 | 2.00 | 2.215 |
| 09/08/2001 | Thursday | 0.22 | 2.00 | 2.215 |
| 10/08/2001 | Friday | 0.18 | 2.00 | 2.215 |
| 11/08/2001 | Saturday | 0.00 | 2.00 | 2.215 |
| 12/08/2001 | Sunday | 0.00 | 2.00 | 2.215 |
| 13/08/2001 | Monday | 0.19 | 2.00 | 2.215 |
| 14/08/2001 | Tuesday | 0.20 | 2.00 | 2.215 |
| 15/08/2001 | Wednesday | 0.21 | 2.21 | 2.005 |
| 16/08/2001 | Thursday | 0.22 | 2.43 | 1.823 |
| 17/08/2001 | Friday | 0.18 | 2.61 | 1.697 |
| 18/08/2001 | Saturday | 0.00 | 2.61 | 1.697 |
| 19/08/2001 | Sunday | 0.00 | 2.61 | 1.697 |
| 20/08/2001 | Monday | 0.19 | 2.80 | 1.582 |
| 21/08/2001 | Tuesday | 0.20 | 3.00 | 1.477 |
| 22/08/2001 | Wednesday | 0.21 | 3.21 | 1.380 |
| 23/08/2001 | Thursday | 0.22 | 3.43 | 1.292 |
| 24/08/2001 | Friday | 0.18 | 3.61 | 1.227 |
| 25/08/2001 | Saturday | 0.00 | 3.61 | 1.227 |
| 26/08/2001 | Sunday | 0.00 | 3.61 | 1.227 |
| 27/08/2001 | Monday | 0.19 | 3.80 | 1.166 |
| 28/08/2001 | Tuesday | 0.20 | 4.00 | 1.108 |
| 29/08/2001 | Wednesday | 0.21 | 4.21 | 1.052 |
| 30/08/2001 | Thursday | 0.22 | 4.43 | 1.000 |

FIG. 3B

| Date | Days from End of Month | Forecast without Feedback | Actual Month End | Forecast Actual | Date | Forecast without Feedback | Actual Month End | Forecast Date Actual | Date | Forecast without Feedback ~404 | Actual Month End ~406 | Forecast Actual ~408 | Average Forecast Actual ~410 | Feedback Factor ~412 |
|---|---|---|---|---|---|---|---|---|---|---|---|---|---|---|
| 01/05/2001 | 30 | 22723894 | 23000000 | 0.988 | NA | NA | NA | 0.884 | 01/07/2001 | 19245997 | 23700000 | 0.812 | 0.895 | 1.110 |
| 02/05/2001 | 29 | 24023644 | 23000000 | 1.071 | 01/06/2001 | 19893825 | 22500000 | 0.884 | 02/07/2001 | 23816174 | 23700000 | 1.005 | 0.986 | 1.014 |
| 03/05/2001 | 28 | 24815214 | 23000000 | 1.082 | 02/06/2001 | 23314244 | 22500000 | 1.036 | 03/07/2001 | 24095305 | 23700000 | 1.017 | 1.045 | 0.957 |
| 04/05/2001 | 27 | 24970914 | 23000000 | 1.086 | 03/06/2001 | 23453655 | 22500000 | 1.042 | 04/07/2001 | 24371019 | 23700000 | 1.028 | 1.052 | 0.950 |
| 05/05/2001 | 26 | 24947325 | 23000000 | 1.085 | 04/06/2001 | 24129938 | 22500000 | 1.072 | 05/07/2001 | 24601721 | 23700000 | 1.038 | 1.065 | 0.939 |
| 06/05/2001 | 25 | 25014278 | 23000000 | 1.088 | 05/06/2001 | 24400199 | 22500000 | 1.084 | 06/07/2001 | 24806705 | 23700000 | 1.047 | 1.073 | 0.932 |
| 07/05/2001 | 24 | 23756590 | 23000000 | 1.033 | 06/06/2001 | 25096910 | 22500000 | 1.115 | 07/07/2001 | 24716399 | 23700000 | 1.043 | 1.064 | 0.940 |
| 08/05/2001 | 23 | 23703011 | 23000000 | 1.031 | 07/06/2001 | 25335025 | 22500000 | 1.126 | 08/07/2001 | 24807057 | 23700000 | 1.047 | 1.065 | 0.937 |
| 09/05/2001 | 22 | 24368240 | 23000000 | 1.059 | 08/06/2001 | 25783130 | 22500000 | 1.146 | 09/07/2001 | 24849971 | 23700000 | 1.048 | 1.085 | 0.922 |
| 10/05/2001 | 21 | 24952028 | 23000000 | 1.085 | 09/06/2001 | 24930720 | 22500000 | 1.108 | 10/07/2001 | 25263311 | 23700000 | 1.068 | 1.086 | 0.920 |
| 11/05/2001 | 20 | 24957480 | 23000000 | 1.085 | 10/06/2001 | 24857078 | 22500000 | 1.105 | 11/06/2001 | 25541708 | 23700000 | 1.082 | 1.091 | 0.917 |
| 12/05/2001 | 19 | 25893011 | 23000000 | 1.126 | 11/06/2001 | 25834568 | 22500000 | 1.139 | 12/07/2001 | 25391527 | 23700000 | 1.071 | 1.112 | 0.899 |
| 13/05/2001 | 18 | 25949541 | 23000000 | 1.128 | 12/06/2001 | 25917924 | 22500000 | 1.152 | 13/07/2001 | 25746587 | 23700000 | 1.056 | 1.122 | 0.891 |
| 14/05/2001 | 17 | 26285248 | 23000000 | 1.143 | 13/06/2001 | 25701085 | 22500000 | 1.142 | 14/07/2001 | 25981534 | 23700000 | 1.096 | 1.127 | 0.887 |
| 15/05/2001 | 16 | 25912957 | 23000000 | 1.127 | 14/06/2001 | 25765022 | 22500000 | 1.145 | 15/07/2001 | 26119343 | 23700000 | 1.102 | 1.125 | 0.889 |
| 16/05/2001 | 15 | 25407945 | 23000000 | 1.105 | 15/06/2001 | 25170378 | 22500000 | 1.119 | 16/06/2001 | 25858467 | 23700000 | 1.091 | 1.105 | 0.905 |
| 17/05/2001 | 14 | 24977412 | 23000000 | 1.086 | 16/06/2001 | 25138519 | 22500000 | 1.117 | 17/07/2001 | 25264061 | 23700000 | 1.006 | 1.090 | 0.918 |
| 18/05/2001 | 13 | 24599177 | 23000000 | 1.070 | 17/06/2001 | 25219761 | 22500000 | 1.121 | 18/07/2001 | 24963764 | 23700000 | 1.053 | 1.061 | 0.925 |
| 19/05/2001 | 12 | 24594885 | 23000000 | 1.059 | 18/06/2001 | 24880579 | 22500000 | 1.106 | 19/07/2001 | 24496333 | 23700000 | 1.034 | 1.070 | 0.935 |
| 20/05/2001 | 11 | 27414114 | 23000000 | 1.075 | 19/06/2001 | 24325820 | 22500000 | 1.081 | 20/07/2001 | 24246702 | 23700000 | 1.023 | 1.060 | 0.944 |
| 21/05/2001 | 10 | 24635034 | 23000000 | 1.071 | 20/06/2001 | 23750971 | 22500000 | 1.056 | 21/07/2001 | 24290916 | 23700000 | 1.025 | 1.061 | 0.952 |
| 22/05/2001 | 9 | 24292775 | 23000000 | 1.056 | 21/06/2001 | 23259970 | 22500000 | 1.034 | 22/07/2001 | 24392054 | 23700000 | 1.029 | 1.040 | 0.962 |
| 23/05/2001 | 8 | 23021723 | 23000000 | 1.040 | 22/06/2001 | 22883632 | 22500000 | 1.017 | 23/07/2001 | 24335261 | 23700000 | 1.027 | 1.028 | 0.973 |
| 24/05/2001 | 7 | 23823000 | 23000000 | 1.027 | 23/06/2001 | 22977881 | 22500000 | 1.021 | 24/07/2001 | 24180280 | 23700000 | 1.020 | 1.023 | 0.978 |
| 25/05/2001 | 6 | 23385238 | 23000000 | 1.017 | 24/06/2001 | 23041330 | 22500000 | 1.024 | 25/07/2001 | 23886453 | 23700000 | 1.006 | 1.016 | 0.984 |
| 26/05/2001 | 5 | 24011151 | 23000000 | 1.044 | 25/06/2001 | 22907233 | 22500000 | 1.018 | 26/07/2001 | 23663595 | 23700000 | 1.007 | 1.023 | 0.978 |
| 27/05/2001 | 4 | 24109843 | 23000000 | 1.048 | 26/06/2001 | 22595397 | 22500000 | 1.004 | 27/07/2001 | 23682675 | 23700000 | 0.999 | 1.017 | 0.983 |
| 28/05/2001 | 3 | 23707582 | 23000000 | 1.031 | 27/06/2001 | 22299474 | 22500000 | 0.991 | 28/07/2001 | 23960406 | 23700000 | 1.011 | 1.011 | 0.989 |
| 29/05/2001 | 2 | 23379933 | 23000000 | 1.017 | 28/06/2001 | 22244805 | 22500000 | 0.939 | 29/07/2001 | 24046069 | 23700000 | 1.015 | 1.007 | 0.993 |
| 30/05/2001 | 1 | 23272594 | 23000000 | 1.012 | 29/06/2001 | 21981808 | 22500000 | 0.976 | 30/07/2001 | 24142444 | 23700000 | 1.019 | 1.002 | 0.996 |
| 31/05/2001 | 0 | 23050131 | 23000000 | 1.002 | 30/06/2001 | 21935818 | 22500000 | 0.975 | 31/07/2001 | 24080722 | 23700000 | 1.010 | 0.998 | 1.002 |

FIG. 4

| Date | Day Weight | Rolling Weight | Monthly Weight | Proj Factor | Bank Holiday Modifier | New Daily Weight | New Rolling Weight | New Monthly Weight | New Proj Factor | Holiday Coeffice. |
|---|---|---|---|---|---|---|---|---|---|---|
| 01/08/2002 | 0.1936 | 2.0002 | 4.3825 | 2.1910 | 1 | 0.1936 | 2.0002 | 4.2629 | 2.1312 | 0.9727 |
| 02/08/2002 | 0.1885 | 2.0002 | 4.3825 | 2.1910 | 1 | 0.1885 | 2.0002 | 4.2629 | 2.1312 | 0.9727 |
| 03/08/2001 | 0 | 2.0002 | 4.3825 | 2.1910 | 1 | 0.0000 | 2.0002 | 4.2629 | 2.1312 | 0.9727 |
| 04/08/2002 | 0 | 2.0002 | 4.3825 | 2.1910 | 1 | 0.0000 | 2.0002 | 4.2629 | 2.1312 | 0.9727 |
| 05/08/2002 | 0.2196 | 2.0002 | 4.3825 | 2.1910 | 1 | 0.2198 | 2.0002 | 4.2629 | 2.1312 | 0.9727 |
| 06/08/2002 | 0.2011 | 2.0002 | 4.3825 | 2.1910 | 1 | 0.2011 | 2.0002 | 4.2629 | 2.1312 | 0.9727 |
| 07/08/2002 | 0.1973 | 2.0002 | 4.3825 | 2.1910 | 1 | 0.1973 | 2.0002 | 4.2629 | 2.1312 | 0.9727 |
| 08/08/2002 | 0.1936 | 2.0002 | 4.3825 | 2.1910 | 1 | 0.1936 | 2.0002 | 4.2629 | 2.1312 | 0.9727 |
| 09/08/2002 | 0.1885 | 2.0002 | 4.3825 | 2.1910 | 1 | 0.1885 | 2.0002 | 4.2629 | 2.1312 | 0.9727 |
| 10/08/2002 | 0 | 2.0002 | 4.3825 | 2.1910 | 1 | 0.0000 | 2.0002 | 4.2629 | 2.1312 | 0.9727 |
| 11/08/2002 | 0 | 2.0002 | 4.3825 | 2.1910 | 1 | 0.0000 | 2.0002 | 4.2629 | 2.1312 | 0.9727 |
| 12/08/2002 | 0.2196 | 2.0002 | 4.3825 | 2.1910 | 1 | 0.2196 | 2.0002 | 4.2629 | 2.1312 | 0.9727 |
| 13/08/2002 | 0.2011 | 2.0002 | 4.3825 | 2.1910 | 1 | 0.2011 | 2.0002 | 4.2629 | 2.1312 | 0.9727 |
| 14/08/2002 | 0.1973 | 2.0002 | 4.3825 | 2.1910 | 1 | 0.1973 | 2.0002 | 4.2629 | 2.1312 | 0.9727 |
| 15/08/2002 | 0.1936 | 2.1938 | 4.3825 | 1.9977 | 1 | 0.1936 | 2.1938 | 4.2629 | 1.9432 | 0.9727 |
| 16/08/2002 | 0.1885 | 2.3823 | 4.3825 | 1.8396 | 1 | 0.1885 | 2.3823 | 4.2629 | 1.7894 | 0.9727 |
| 17/08/2002 | 0 | 2.3823 | 4.3825 | 1.8396 | 1 | 0.0000 | 2.3823 | 4.2629 | 1.7894 | 0.9727 |
| 18/08/2002 | 0 | 2.3823 | 4.3825 | 1.8396 | 1 | 0.0000 | 2.3823 | 4.2629 | 1.7894 | 0.9727 |
| 19/08/2002 | 0.2196 | 2.6019 | 4.3825 | 1.6843 | 1 | 0.2196 | 2.6019 | 4.2629 | 1.6384 | 0.9727 |
| 20/08/2002 | 0.2011 | 2.803 | 4.3825 | 1.5635 | 1 | 0.2011 | 2.8030 | 4.2629 | 1.5208 | 0.9727 |
| 21/08/2002 | 0.1973 | 3.0003 | 4.3825 | 1.4607 | 1 | 0.1973 | 3.0003 | 4.2629 | 1.4208 | 0.9727 |
| 22/08/2002 | 0.1936 | 3.1939 | 4.3825 | 1.3721 | 1 | 0.1936 | 3.1939 | 4.2629 | 1.3347 | 0.9727 |
| 23/08/2002 | 0.1885 | 3.3824 | 4.3825 | 1.2957 | 1 | 0.1885 | 3.3824 | 4.2629 | 1.2603 | 0.9727 |
| 24/08/2002 | 0 | 3.3824 | 4.3825 | 1.2957 | 1 | 0.0000 | 3.3824 | 4.2629 | 1.2603 | 0.9727 |
| 25/08/2002 | 0 | 3.3824 | 4.3825 | 1.2957 | 1 | 0.0000 | 3.3824 | 4.2629 | 1.2603 | 0.9727 |
| 26/08/2002 | 0.2196 | 3.602 | 4.3825 | 1.2167 | 0.1 | 0.0220 | 3.4044 | 4.2629 | 1.2622 | 1.0292 |
| 27/08/2002 | 0.2011 | 3.8031 | 4.3825 | 1.1523 | 1.1 | 0.2212 | 3.6256 | 4.2629 | 1.1758 | 1.0203 |
| 28/08/2002 | 0.1973 | 4.0004 | 4.3825 | 1.0955 | 1.1 | 0.2170 | 3.8426 | 4.2629 | 1.1094 | 1.0127 |
| 29/08/2002 | 0.1936 | 4.194 | 4.3825 | 1.0449 | 1.1 | 0.2130 | 4.0556 | 4.2629 | 1.0511 | 1.0059 |
| 30/08/2002 | 0.1885 | 4.3825 | 4.3825 | 1.000 | 1.1 | 0.2074 | 4.2629 | 4.2629 | 1.0000 | 1.0000 |
| 31/08/2002 | 0 | 4.3835 | 4.3825 | 1.000 | 1 | 0.0000 | 4.2629 | 4.2629 | 1.0000 | 1.0000 |
| 01/09/2002 | 0 | 2.0002 | 4.22 | 2.1098 | 1 | 0.0000 | 1.8806 | 4.3200 | 2.2971 | 1.0888 |
| 02/09/2002 | 0.2196 | 2.0002 | 4.22 | 2.1098 | 1.1 | 0.2416 | 1.9026 | 4.3200 | 2.2706 | 1.0762 |
| 03/09/2002 | 0.2011 | 2.0002 | 4.22 | 2.1098 | 1.1 | 0.2212 | 1.9227 | 4.3200 | 2.2469 | 1.0650 |
| 04/09/2002 | 0.1973 | 2.0002 | 4.22 | 2.1098 | 1.1 | 0.2170 | 1.9424 | 4.3200 | 2.2240 | 1.0542 |
| 05/09/2002 | 0.1936 | 2.0002 | 4.22 | 2.1098 | 1.1 | 0.2130 | 1.9618 | 4.3200 | 2.2021 | 1.0438 |
| 06/09/2002 | 0.1885 | 2.0002 | 4.22 | 2.1098 | 1.1 | 0.2074 | 1.9806 | 4.3200 | 2.1811 | 1.0338 |
| 07/09/2002 | 0 | 2.0002 | 4.22 | 2.1098 | 1 | 0.0000 | 1.9806 | 4.3200 | 2.1811 | 1.0338 |
| 08/09/2002 | 0 | 2.0002 | 4.22 | 2.1098 | 1 | 0.0000 | 1.9806 | 4.3200 | 2.1811 | 1.0338 |
| 09/08/2002 | 0.2196 | 2.0002 | 4.22 | 2.1098 | 1 | 0.2196 | 2.1783 | 4.3200 | 1.9832 | 0.9400 |
| 10/09/2002 | 0.2011 | 2.0002 | 4.22 | 2.1098 | 1 | 0.2011 | 2.1582 | 4.3200 | 2.0017 | 0.9488 |
| 11/09/2002 | 0.1973 | 2.0002 | 4.22 | 2.1098 | 1 | 0.1973 | 2.1384 | 4.3200 | 2.0202 | 0.9575 |
| 12/09/2002 | 0.1936 | 2.0002 | 4.22 | 2.1098 | 1 | 0.1936 | 2.1191 | 4.3200 | 2.0386 | 0.9663 |
| 13/09/2002 | 0.1885 | 2.0002 | 4.22 | 2.1098 | 1 | 0.1885 | 2.1002 | 4.3200 | 2.0569 | 0.9750 |
| 14/09/2002 | 0 | 2.0002 | 4.22 | 2.1098 | 1 | 0.0000 | 2.1002 | 4.3200 | 2.0569 | 0.9750 |
| 15/09/2002 | 0 | 2.0002 | 4.22 | 2.1098 | 1 | 0.0000 | 2.1002 | 4.3200 | 2.0569 | 0.9750 |
| 16/09/2002 | 0.2196 | 2.2198 | 4.22 | 1.9011 | 1 | 0.2196 | 2.3198 | 4.3200 | 1.8622 | |
| 17/09/2002 | 0.2011 | 2.4209 | 4.22 | 1.7432 | 1 | 0.2011 | 2.5209 | 4.3200 | 1.7137 | 0.9881 |
| 18/09/2002 | 0.1973 | 2.6182 | 4.22 | 1.6118 | 1 | 0.1973 | 2.7182 | 4.3200 | 1.5893 | 0.9860 |
| 19/09/2002 | 0.1936 | 2.8118 | 4.22 | 1.5008 | 1 | 0.1036 | 2.9118 | 4.3200 | 1.4836 | 0.9885 |
| 20/09/2002 | 0.1885 | 3.0003 | 4.22 | 1.4065 | 1 | 0.1885 | 3.1003 | 4.3200 | 1.3934 | 0.9907 |
| 21/09/2002 | 0 | 3.0003 | 4.22 | 1.4065 | 1 | 0.0000 | 3.1003 | 4.3200 | 1.2934 | 0.9907 |
| 22/09/2002 | 0 | 3.0003 | 4.22 | 1.4065 | 1 | 0.0000 | 3.1003 | 4.3200 | 1.3934 | 0.9907 |
| 23/09/2002 | 0.2196 | 3.2199 | 4.22 | 1.3106 | 1 | 0.2196 | 3.3199 | 4.3200 | 1.3012 | 0.9929 |
| 24/09/2002 | 0.2011 | 3.421 | 4.22 | 1.2336 | 1 | 0.2011 | 3.5210 | 4.3200 | 1.2269 | 0.9946 |
| 25/09/2002 | 0.1973 | 3.6183 | 4.22 | 1.1663 | 1 | 0.1973 | 3.7183 | 4.3200 | 1.1618 | 0.9967 |
| 26/09/2002 | 0.1936 | 3.8119 | 4.22 | 1.1071 | 1 | 0.1936 | 3.9119 | 4.3200 | 1.1043 | 0.9975 |
| 27/09/2002 | 0.1885 | 4.0004 | 4.22 | 1.0549 | 1 | 0.1885 | 4.1004 | 4.3200 | 1.0536 | 0.9981 |
| 28/09/2002 | 0 | 4.0004 | 4.22 | 1.0549 | 1 | 0.0000 | 4.1004 | 4.3200 | 1.0536 | 0.9986 |
| 29/09/2002 | 0 | 4.0004 | 4.22 | 1.0549 | 1 | 0.0000 | 4.1004 | 4.3200 | 1.0536 | 0.9987 |
| 30/09/2002 | 0.2196 | 4.22 | 4.22 | 1.0000 | 1 | 0.2196 | 4.3200 | 4.3200 | 1.0000 | 1.0000 |

FIG. 5

METHOD AND SYSTEM FOR RAPIDLY PROJECTING AND FORECASTING PHARMACEUTICAL MARKET INFORMATION

CROSS-REFERENCE TO RELATED APPLICATION

This application is related to U.S. Provisional Patent Application 60/347,417, filed on Jan. 11, 2002, from which priority is claimed.

FIELD OF THE INVENTION

The present invention is directed to techniques for reporting cumulative pharmaceutical sales from wholesalers to retail outlets in a given geographic market.

BACKGROUND INFORMATION

The pharmaceutical industry is one of the largest income generating industries in the world. As revenue in this industry has steadily increased, it has become increasing important to determine the cumulative volume of sales for individual pharmaceutical products, e.g., penicillin, or groups of pharmaceuticals, e.g., "pain killers," during a predefined time period. At present, the cumulative volume of such pharmaceutical product sales can be provided only once actual sales data for the predefined time period has been received. Thus, if cumulative volume data is needed for a particular calendar month, such data will not be available until all wholesalers in the given predefined market have reported their actual sales to retail outlets for every day in the requested month.

It would be beneficial to determine a projected cumulative volume of pharmaceutical sales during the current month. Unfortunately, to date such techniques are not available because multiple erratic parameters exist in such an analysis, such as lower sales due to a national holiday, making such analysis speculative at best.

Accordingly, there exists a need for a technique to provide an accurate and robust forecast of the cumulative monthly amount of sales of individual pharmaceuticals, or groups of pharmaceuticals, to retail outlets in a particular geographic market.

SUMMARY OF THE INVENTION

An object of the present invention is to provide a forecast of the cumulative sales total of one or more pharmaceuticals, from one or more wholesalers to one or more retail outlets, for a current predetermined time period. It is a further object of the present invention to provide adjustments to the forecast based upon past accuracy to ensure a reliable prediction.

In order to achieve these objectives, as well as others which will become apparent in the disclosure below, the present invention provides forecasting of the cumulative sales of an individual pharmaceutical, or group of pharmaceuticals, during a current month. In a preferred embodiment, daily data for the sale of a particular pharmaceutical, or group of pharmaceuticals, is acquired from a sampling of one or more wholesalers in a pre-defined geographic market. Using this data, as well as predetermined market share information for a defined geographic market of wholesalers who provided the data, a projection of total sales for that day is extrapolated.

Next, the most recent sales forecasting data is used to forecast the current month's cumulative sales of a particular pharmaceutical, or group of pharmaceuticals. Preferably, such data relates back at least 14 days.

Advantageously, a feedback correction technique may be implemented to adjust the current monthly prediction based upon past prediction errors. Preferably, past predicted values are compared with past actual values to determine the margin of error of the techniques' prediction. Based upon the margin of error, the current forecast may be adjusted.

A current monthly prediction may be adjusted to account for changes in sales activity due to national or local holidays in the pre-defined geographic market. Further, forecast confidence limits may be utilized in order to bound the accuracy of the prediction.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein:

FIG. 3(b) is a sample table illustrating proportions used to determine the relative size of sales for days for an entire month in accordance with the present invention;

FIG. 4 is a sample table illustrating feedback factors in accordance with the present invention; and FIG. 5 is a sample table illustrating the holiday modifier and coefficient in accordance with the present invention.

DESCRIPTION OF A PRESENTLY PREFERRED EMBODIMENT

Figure 1A:
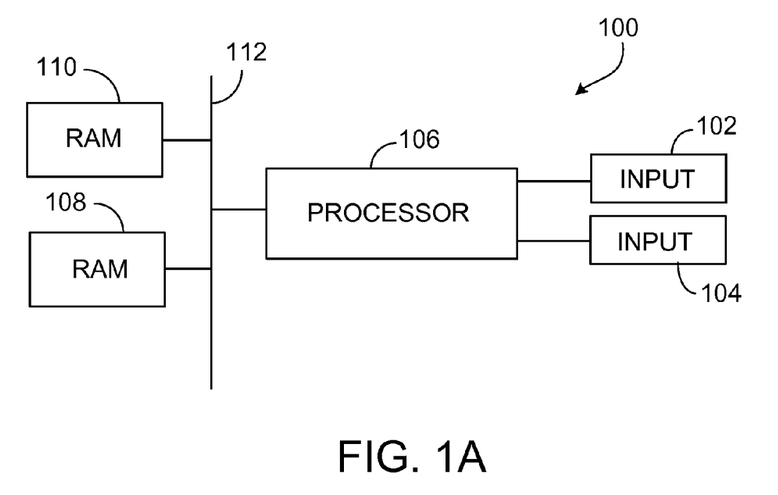
FIG. 1(a) is a functional diagram of an exemplary system of the present invention.
Figure 1B:
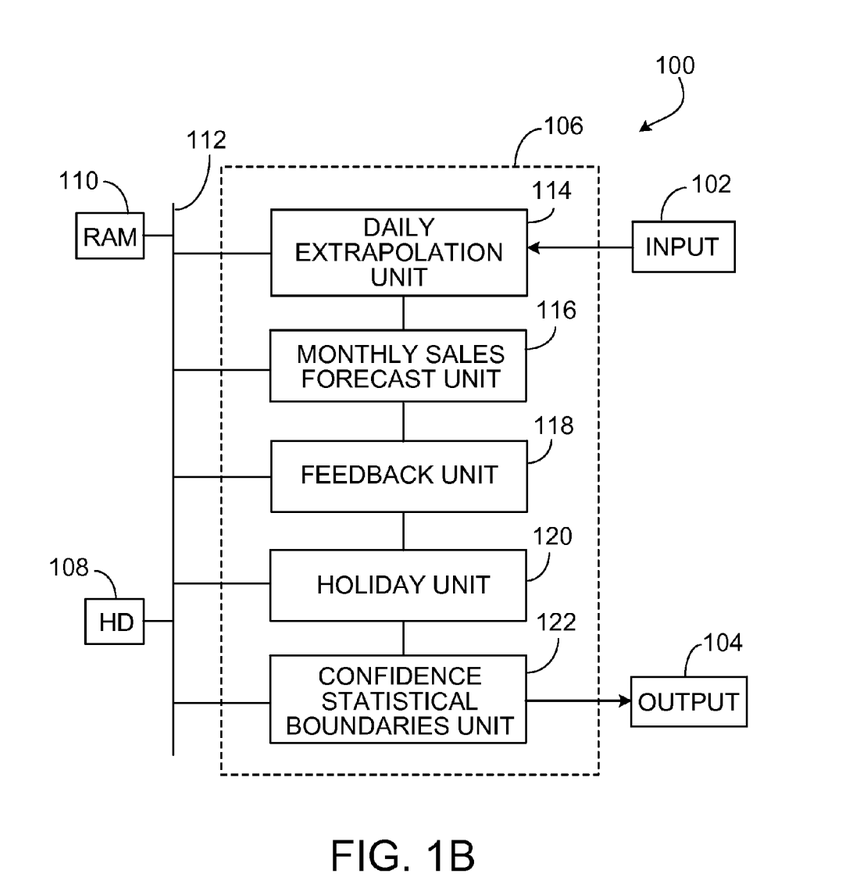
FIG. 1(b) is a more detailed functional diagram of the system of the present invention.

Referring to FIG. 1(a), in a preferred embodiment, the present system 100 includes a processor 106 coupled to an input 102 and output 104. The processor 106 is also coupled to a data bus 112 to exchange data with both volatile and non-volatile memory devices such as random access memory device 110 and a one or more hard drives 108. Referring to FIG. 1(b), the processor 106 includes, at least, a daily extrapolation unit 114, a monthly sales forecast unit 116, a feedback unit 118, a holiday unit 120, and a confidence intervals unit 122. Each of the above units of the processor 106 are coupled to data bus 112 to exchange data with random access memory device 110 and a one or more hard drives 108. Further, daily extrapolation unit 114 is coupled to input 102 and confidence intervals unit 122 is coupled to output 104.

Figure 2:
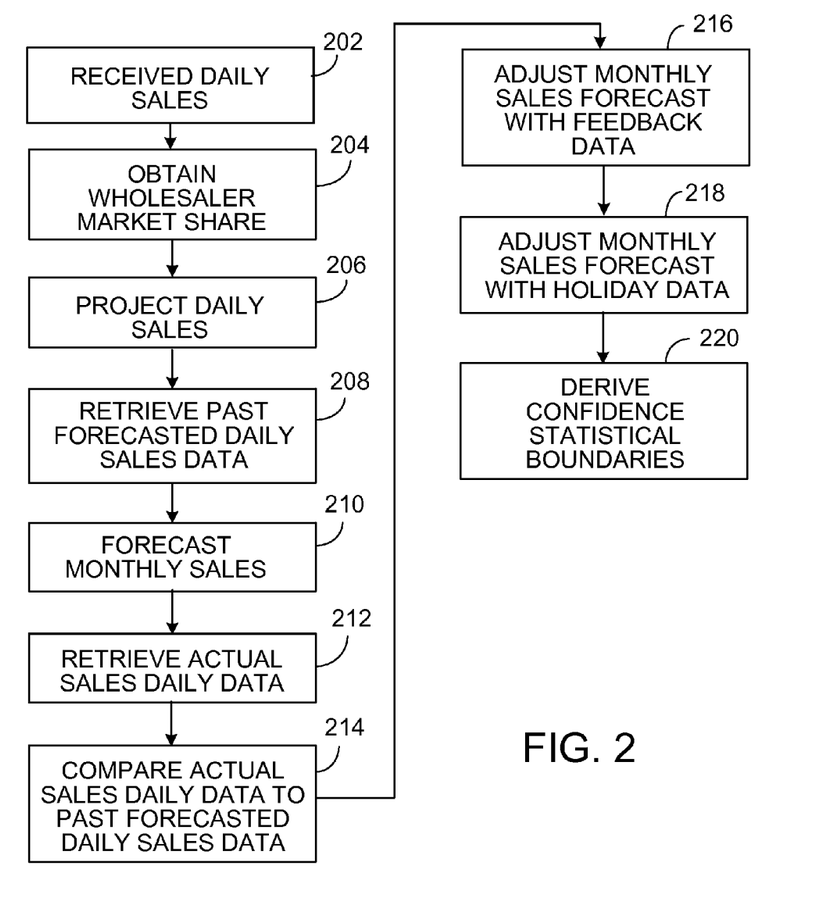
FIG. 2 is a flow diagram showing the basic process flow of the projection and forecasting system and method of the present invention.

Referring next to FIG. 2, a preferred method, which may be implemented on the system of FIG. 1(b), is shown. In step 202, the daily extrapolation unit 114 receives pharmaceutical sales data from a sampling of one or more wholesalers in a pre-defined geographic market for a pharmaceutical, or group of pharmaceuticals (hereinafter collectively referred to as a singular "pharmaceutical" for ease of explanation) from input 102. Such a pre-defined geographic market is preferably at most a country, e.g., the United States of America, the United Kingdom, etc., but may be defined into smaller regions for sales management purposes, such as states, counties, grouped regions, or other pre-defined geographical limiters ("territory") The sampling represents sales data from less that 100% of wholesalers of a particular pharmaceutical in the pre-defined geographic market. Next, daily extrapolation unit 114 obtains market share data for the wholesalers that provided the daily sales data. In step 204, the daily extrapolation unit 114 obtains market share data for the wholesalers that provided the sample data.

Next, in step 206, the actual daily data received from the sample of wholesalers and their respective market shares is then extrapolated by the daily extrapolation unit 114 to forecast a cumulative daily sales total. For example, if for a given day, wholesaler "A" with 20 percent market share of the penicillin market reports 1 million dollars in sales in a territory, and wholesaler "B" with 30 percent market share of the penicillin market reports 2 million dollars in sales in the territory, then the forecasted daily sales total for penicillin in the territory would be extrapolated to be 6 million dollars. This forecasted daily sales total is then pasted to the monthly sales forecast unit 116.

Figure 3A:
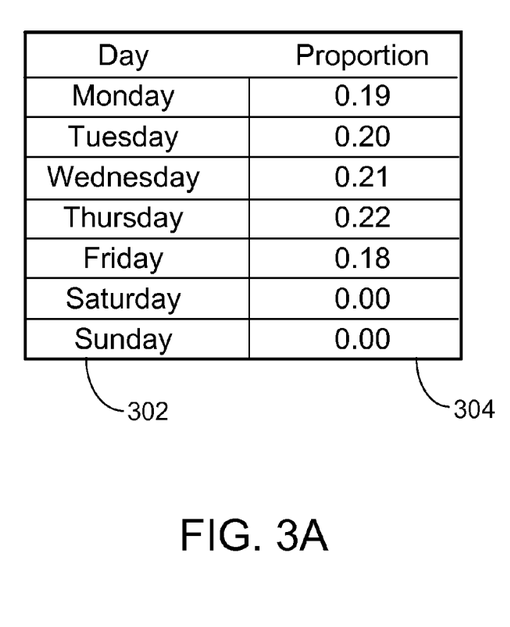
FIG. 3(a) is a sample table illustrating a sample of proportions used to determine the relative size of sales for days of one week in accordance with the present invention.

In step 208, the monthly sales forecast unit 116 retrieves past forecasted daily sales data for at least the past 13 days. Next, in step 210, the monthly sales forecast unit 116 provides a first projection of cumulative monthly sales for a pharmaceutical by analyzing the past forecasted daily sales data. In particular, the monthly sales forecast unit 116 first provides a "relative weight of day" integer for each day of the week. The "relative weight of day" integer is simply an integer representing the total percentage of sales of a particular pharmaceutical on a given day in the week, on average, versus the entire week. For example, referring to FIG. 3(*a*), each day of the week 302 is given a "relative weight of day" integer, also known as a "weighted daily proportion" 304. Continuing with above example, 19% of each week's sale of penicillin are on Mondays, thus the "relative weight of day" integer would be 0.19 for Mondays. The total of "relative weight of day" integers for any week must equal 100 percent, or quantitatively 1.0. This weekly "relative weight of day" model is then populated against all days of a month as can be seen in FIG. 3(*b*), 312. This "relative weight of day" method is necessary to ensure that days, such as weekends, with typically lower sales, are properly forecasted.

Referring next to FIG. 3(*b*), in a preferred embodiment, the monthly sales forecast unit 116 uses at least 14 days 308, 310 of data to generate a monthly forecast. For example, if the sampling of daily sales data for Aug. 1, 2001 has been received and extrapolated to project a daily total for Aug. 1, 2001, the past 13 days of forecasted sales data are used to generate a sum total of sales for this 14 day period.

Next, by adding up all of the "relative weight of day" integers 312, the relative size of the month is determined. This is necessary because most months have more than 28 days. Twenty-eight days would be exactly 4.0 weighted days 312. Using FIG. 2(*b*), the relative size of August 2001 is 4.43. The monthly sales forecast unit 116 then divides the borrowed weight "2.0" 314 for the at least 14 days of past forecasts sales data used in the current prediction, by the relative size of the entire month of August, 4.43. The borrowed weight is the sum total of "relative weight of day" integers for the 14 days of past forecasts sales data. The result of this operation is a "forecast factor" "2.215" 316. The forecast factor is then multiplied by the cumulative total of sales for the known past forecasted 2.0 week period to arrive at a current forecast for the entire current month.

Preferably, at least one day of a current month's actual daily sampled data is used in step 210. As the number of days of actual daily sampled data increases, the forecast will become more accurate. Thus, a forecast using Aug. 14, 2001 and earlier data should be more accurate than a forecast using Aug. 1, 2001 data.

The present technique preferably uses the current days extrapolation and at least 13 prior past daily forecasts. The past daily forecasts may be from the current month, or from the preceding month. If the past daily forecasts used are from the preceding month, preferably not more that 13 days of a preceding month's data are used. However, once daily sampled data for the 15th day of a current month, e.g., Aug. 15, 2001, is received, which is then extrapolated as described above, more that the prior 13 days of past daily forecasts may be used, since at that point the more than 13 days of past daily forecasts are available for the current month. Thus, by the last day of the month, all prior days in that month are used in the forecasting.

Once the number of days used in the forecast exceeds 14, the "borrowed weight" of the known forecast 314 must be adjusted to calculate a corrected forecast factor. For example, on Aug. 15, 2001, since a total of 15 forecast days are used, adding up the "relative weight of day" integers of those 15 days, the borrowed weight 314 would not be 2.0, but rather 2.21. Similarly, the borrowed weight 314 on the last day of any month would equal the relative size of the month, and the forecast factor would be 1.0 accordingly.

Once a forecasted cumulative monthly sales figure is generated in step 210, the figure is pasted from the monthly sales forecast unit 116 to the feedback unit 118. In step 212, the feedback unit 116 preferably retrieves actual daily sales data from the preceding three months. Also referring to FIG. 4, using the actual daily sales data from the preceding three months, the feedback unit 116 first calculates the sum total of actual sales for each of those preceding months. Then, in step 214, the feedback unit 116 determines the difference between each past forecast for each day of the past preceding months verses the actual sales total for each respective month. Based upon the averaged difference 410 across the three preceding months, the feedback unit 116 calculates a "feedback factor" 412 for that day indicating the adjustment needed. In step 216, this feedback factor 412 is then multiplied by the forecasted cumulative monthly sales figure to provide a more accurate prediction.

The forecasted cumulative monthly sales figure may be further adjusted, in step 218, by performing an adjustment for national or local holidays. Sales are likely to decrease on a national or local holiday, but these sales are not lost sales. Rather, many routine sales that fall on a holiday in a given month are typically shifted as a sale before or after the holiday. For example, if a holiday falls on a Monday, the sales of Prozac® for Prozac® patients who normally purchase on Monday, will simply occur during the remainder of the week, because the Prozac® patients still need their Prozac® irrespective of a holiday.

Also referring to FIG. 5, the holiday unit 120 preferably identifies holidays by date 502, 508 and sales that would normal happen on such day are redistributed to adjacent days by a "holiday modifier" 504 to produce a "holiday coefficient" 506. The holiday coefficient is used to adjust the forecast to redistribute the effect of holiday across all days in the current month to provide a better forecast of what the month's sales would be if no holiday occurred. If a month has no holidays, all days in that month would have a holiday coefficient of 1.0. The holiday coefficient for a given day is multiplied by the forecasted cumulative monthly sales figure after "feedback" to achieve a more accurate result.

In step 220, a statistic analysis is preformed in the forecasted cumulative monthly sales figure after "feedback" and "holiday" processing 216, 218 to provide confidence intervals indicating the present techniques' confidence in its forecast. In a preferred embodiment of the present invention the following is used to determine the confidence intervals:

$$\text{Confidence Interval} = \text{forecast} \pm z\sqrt{\text{MSE}}; \qquad (1)$$

where MSE is the mean square error.

The forecasted cumulative monthly sales figure, preferably with confidence interval, generated daily by the above-described system and method is reported to a plurality of pharmaceutical manufacturers in the defined territory ("Report"). Such Reports may be available in physical print, or web based reporting accessible via the Internet, or other data driven reporting accessible through other distributed computer networks. Advantageously, sales management, senior management, marketing, and market research personnel at pharmaceutical manufacturers use the Reports to feedback into their operation of business such that each manufacturer may provide (1) better internal reporting of their sales volume and projected sales volume, and (2) short term corrective sales action, e.g., modification of production levels, inventory and/or sales approaches, based upon such Reports. Thus, manufacturers may modify their behavior in response to the Reports. Further, the Reports may be used for external briefings by the media, e.g., city analysts, journalists, etc.

The above system and method may be implemented by many computer languages commonly known in the art and may operate on many computer platforms which include both volatile and non-volatile memory storage devices. In a preferred embodiment, the system and method of the present invention is implemented, in whole or in part, on an IBM 7017-S70 computer system. Software code encapsulating the functionality of the present inventive technique may be implemented on such computer systems, preferably written in Oracle PL*SQL.

Although the invention has been described herein by reference to an exemplary embodiment thereof, it will be understood that such embodiment is susceptible of modification and variation without departing from the inventive concepts disclosed. All such modifications and variations, therefore, are intended to be encompassed within the spirit and scope of the appended claims.

The invention claimed is:

1. A method for forecasting the cumulative sales total of one or more pharmaceuticals, from one or more wholesalers to one or more retail outlets, for a current predetermined time period, the method comprising:
   receiving daily pharmaceutical sales data from a sample of said one or more wholesalers, wherein said one or more wholesalers are in a pre-defined geographic market;
   receiving actual pharmaceutical sales data for past predetermined time periods for said pre-defined geographic market; and
   providing, using a processor unit, a predicted cumulative sales total for said current predetermined time period, using said daily pharmaceutical sales data, said actual pharmaceutical sales data, and past forecast sales data, wherein providing said predicted cumulative sales total comprises:
      providing a preliminary predicted cumulative sales total for said current predetermined time period using said daily pharmaceutical sales data; and
      adjusting said preliminary predicted cumulative sales total for said current period based on a difference between said past forecast sales data and said actual pharmaceutical sales data to provide said predicted cumulative sales total for said current predetermined time period,
   wherein adjusting said preliminary predicted cumulative sales total for said current period comprises generating a feedback factor based on a comparison between said past forecast sales data and said actual pharmaceutical sales data, and multiplying said preliminary predicted cumulative sales data by said feedback factor.

2. The method of claim 1, wherein said one or more pharmaceuticals comprises a single pharmaceutical product.

3. The method of claim 1, wherein said one or more pharmaceuticals comprises a group of pharmaceutical products.

4. The method of claim 1, wherein said current predetermined time comprises one month.

5. The method of claim 1, wherein said past predetermined time periods comprise three months.

6. The method of claim 1 further comprising providing a cumulative daily prediction for a pharmaceutical for specific day, after receiving said daily pharmaceutical sales data, based upon said daily pharmaceutical sales data and a market share of each of said one or more wholesalers that provided said daily pharmaceutical sales data.

7. The method of claim 6 further comprising providing said preliminary predicted cumulative sales total, after receiving said cumulative daily prediction, by using at least 14 days of past cumulative daily predictions.

8. The method of claim 1 further comprising providing an adjustment to said predicted cumulative sales total to account for a holiday which occurs in said current predetermined time period.

9. The method of claim 1, further comprising providing confidence intervals for indicating accuracy of said predicted cumulative sales total, after receiving said predicted cumulative sales total.

10. The method of claim 1 further comprising reporting said predicted cumulative sales total to one or more pharmaceutical manufacturers, said one or more pharmaceutical manufacturers using said predicted cumulative sales total for short term corrective sales action.

11. A non-transitory computer storage medium encoded with a computer program, the program comprising instructions that when executed by one or more computers cause the one or more computers to perform operations comprising:
   receiving daily pharmaceutical sales data from a sample of said one or more wholesalers, wherein said one or more wholesalers are in a pre-defined geographic market;
   receiving actual pharmaceutical sales data for past predetermined time periods for said pre-defined geographic market; and
   providing a predicted cumulative sales total for said current predetermined time period, using said daily pharmaceutical sales data, said actual pharmaceutical sales data, and past forecast sales data, wherein providing said predicted cumulative sales total comprises:
      providing a preliminary predicted cumulative sales total for said current predetermined time period using said daily pharmaceutical sales data; and
      adjusting said preliminary predicted cumulative sales total for said current period based on a difference between said past forecast sales data and said actual pharmaceutical sales data to provide said predicted cumulative sales total for said current predetermined time period,
   wherein adjusting said preliminary predicted cumulative sales total for said current period comprises generating a feedback factor based on a comparison between said past forecast sales data and said actual pharmaceutical sales data, and multiplying said preliminary predicted cumulative sales data by said feedback factor.

12. The non-transitory computer storage medium of claim 11, wherein said one or more pharmaceuticals comprises a single pharmaceutical product.

13. The non-transitory computer storage medium of claim 11, wherein said one or more pharmaceuticals comprises a group of pharmaceutical products.

14. The non-transitory computer storage medium of claim 11, wherein said current predetermined time comprises one month.

15. The non-transitory computer storage medium of claim 11, wherein said past predetermined time periods comprise three months.

16. The non-transitory computer storage medium of claim 11, wherein the program further comprises instructions that when executed by one or more computers cause the one or more computers to perform operations comprising:
providing a cumulative daily prediction for a pharmaceutical for specific day, after receiving said daily pharmaceutical sales data, based upon said daily pharmaceutical sales data and a market share of each of said one or more wholesalers that provided said daily pharmaceutical sales data.

17. The non-transitory computer storage medium of claim 16, wherein the program further comprises instructions that when executed by one or more computers cause the one or more computers to perform operations comprising:
providing said preliminary predicted cumulative sales total, after receiving said cumulative daily prediction, by using at least 14 days of past cumulative daily predictions.

18. The non-transitory computer storage medium of claim 11, wherein the program further comprises instructions that when executed by one or more computers cause the one or more computers to perform operations comprising:
providing an adjustment to said predicted cumulative sales total to account for a holiday which occurs in said current predetermined time period.

19. The non-transitory computer storage medium of claim 11, wherein the program further comprises instructions that when executed by one or more computers cause the one or more computers to perform operations comprising:
providing confidence intervals for indicating accuracy of said predicted cumulative sales total, after receiving said predicted cumulative sales total.

20. The non-transitory computer storage medium of claim 11, wherein the program further comprises instructions that when executed by one or more computers cause the one or more computers to perform operations comprising:
reporting said predicted cumulative sales total to one or more pharmaceutical manufacturers, said one or more pharmaceutical manufacturers using said predicted cumulative sales total for short term corrective sales action.

* * * * *